United States Patent
Ishida et al.

(10) Patent No.: US 12,248,591 B2
(45) Date of Patent: Mar. 11, 2025

(54) CONTROL SERVER FOR SHARING DATA USING DISTRIBUTED LEDGER, DATA SHARING SYSTEM WITH DISTRIBUTED LEDGER, AND CONTROL PROGRAM FOR SHARING DATA WITH DISTRIBUTED LEDGER

(71) Applicant: NIPPON TELEGRAPH AND TELEPHONE CORPORATION, Tokyo (JP)

(72) Inventors: Tatsuro Ishida, Tokyo (JP); Shigenori Ohashi, Tokyo (JP); Shigeru Fujimura, Tokyo (JP); Atsushi Nakadaira, Tokyo (JP); Masayoshi Chikada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 132 days.

(21) Appl. No.: 17/785,037

(22) PCT Filed: Dec. 20, 2019

(86) PCT No.: PCT/JP2019/050136
§ 371 (c)(1),
(2) Date: Jun. 13, 2022

(87) PCT Pub. No.: WO2021/124558
PCT Pub. Date: Jun. 24, 2021

(65) Prior Publication Data
US 2023/0004665 A1    Jan. 5, 2023

(51) Int. Cl.
*G06F 21/62*    (2013.01)
*G06F 16/176*    (2019.01)
(Continued)

(52) U.S. Cl.
CPC ........ *G06F 21/6218* (2013.01); *G06F 16/176* (2019.01); *G06F 16/1873* (2019.01);
(Continued)

(58) Field of Classification Search
CPC .... G06F 21/6218; G06F 21/64; G06F 21/602; G06F 21/6245; G06F 21/16; G06F 16/93;
(Continued)

(56) References Cited

U.S. PATENT DOCUMENTS

| 2017/0220814 A1 | 8/2017 | Pathak |
| 2018/0260212 A1 | 9/2018 | Wisnovsky |

(Continued)

FOREIGN PATENT DOCUMENTS

| EP | 3859636 A1 | 8/2021 |
| JP | 2018112827 A | 7/2018 |

(Continued)

OTHER PUBLICATIONS

Chen et al (2017) "An improved P2P File System Scheme based on IPFS and Blockchain" 2017 IEEE International Conference on Big Data (BigData), pp. 2652-2657.

(Continued)

*Primary Examiner* — Djenane M Bayard

(57) ABSTRACT

Upon receiving a usage request that includes a file identifier and a version identifier from a user terminal 20, a control server 10 transmits a file request that is based on the usage request to a file management system, and transmits a permission information request that is based on the usage request to a distributed ledger system. Upon receiving the file request, the file management system acquires the file that corresponds to the combination of the file identifier and the version identifier and transmits the file to the control server 10. Upon receiving the permission information request, the distributed ledger system acquires permission information (Continued)

that corresponds to the combination of the file identifier and the version identifier from a distributed ledger, and transmits the permission information to the control server 10. The control server 10 transmits the file to the user terminal 20 if the user of the user terminal has viewing permission based on the permission information.

6 Claims, 6 Drawing Sheets

(51) Int. Cl.
- *G06F 16/18* (2019.01)
- *H04L 9/00* (2022.01)
- *H04L 9/32* (2006.01)
- *H04L 9/40* (2022.01)

(52) U.S. Cl.
CPC .............. *H04L 9/3239* (2013.01); *H04L 9/50* (2022.05); *H04L 63/0428* (2013.01)

(58) Field of Classification Search
CPC ....... H04L 9/50; H04L 9/3247; H04L 9/0637; H04L 9/0643; H04L 9/3239; H04L 9/3242; H04L 9/3236; H04L 63/102; H04L 9/3297; H04L 9/0894; H04L 2209/56; H04L 63/12; H04L 65/612; H04L 67/52; H04L 67/53; H04L 67/63; H04L 9/30; H04L 67/1097; H04L 67/12; H04L 67/565; H04L 9/0891; H04L 9/0618; H04L 2209/805; H04L 2209/84; H04L 63/0428; H04L 63/06; H04L 63/08; H04L 63/123; H04L 9/0861; H04L 9/14; H04L 2209/603; H04L 51/18; H04L 51/224; H04L 63/101; H04L 9/3213

See application file for complete search history.

(56) References Cited

U.S. PATENT DOCUMENTS

| | | |
|---|---|---|
| 2019/0065764 A1 | 2/2019 | Wood et al. |
| 2019/0354967 A1 | 11/2019 | Lee et al. |
| 2020/0012763 A1* | 1/2020 | Arngren ............... H04L 63/045 |
| 2021/0110108 A1* | 4/2021 | Maguire ............ G06F 16/9014 |
| 2021/0157954 A1* | 5/2021 | Majko-Ruben ..... G06F 16/1873 |
| 2022/0318404 A1* | 10/2022 | Wong ................... G06F 21/602 |

FOREIGN PATENT DOCUMENTS

| | | |
|---|---|---|
| WO | 2019175837 A1 | 9/2019 |
| WO | 2019/226580 A1 | 11/2019 |

OTHER PUBLICATIONS

Nizamuddin et al. (2019) "Decentralized document version control using ethereum blockchain and IPFS", Computers & Electrical Engineering, vol. 76, pp. 183-197.

Gaetani et al. (2017) "Blockchain-Based Database to Ensure Data Integrity in Cloud Computing Environments", Proceedings of the First Italian Conference on Cybersecurity, Venice, Italy, Jan. 1, 2017, pp. 146-155.

* cited by examiner

CONTROL SERVER FOR SHARING DATA USING DISTRIBUTED LEDGER, DATA SHARING SYSTEM WITH DISTRIBUTED LEDGER, AND CONTROL PROGRAM FOR SHARING DATA WITH DISTRIBUTED LEDGER

CROSS-REFERENCE TO RELATED APPLICATIONS

This application is a U.S. National Stage Application filed under 35 U.S.C. § 371 claiming priority to International Patent Application No. PCT/JP2019/050136, filed on 20 Dec. 2019, the disclosure of which is hereby incorporated herein by reference in its entirety.

TECHNICAL FIELD

The technology of the present disclosure relates to a control server, a data sharing system, and a control program.

BACKGROUND ART

There is a system in which files are shared by linking a distributed storage system with a distributed ledger (PTL 1). Also, because handling large files is inconvenient, a lightweight storage method and a method of using links to a storage system have been proposed (NPL 1).

RELATED ART LITERATURE

Patent Literature

PTL 1: JP 2018-112827A

Non Patent Literature

NPL 1: Yongle Chen, et al, "An improved P2P File System Scheme based on IPFS and Blockchain", 2017 IEEE International Conference on Big Data (BIGDATA), pp. 2652-2657.

SUMMARY OF INVENTION

Technical Problem

However, with conventional technology, it is not possible to realize access control that takes the time axis into consideration for files registered in a storage system.

For example, suppose that in the case of a file A in a distributed storage system, a user B has read permission for the file A at some point, and then the user B loses view permission for the file A. When the file A is updated, it is preferable that the user B can view the non-updated version of the file A but cannot view the updated version of the file A. Such viewing permission needs to be controlled.

The technology disclosed herein was made in view of the above points, and an object thereof is to provide a control server, a data sharing system, and a control program according to which the viewing permission of a file managed by a file management system can be managed separately for versions before and after an update.

Solution to Problem

A first aspect of the present disclosure is a control server in a data sharing system that includes the control server, a file management system, and a distributed ledger system having a distributed ledger that includes permission information indicating whether or not each of one or more users has viewing permission for each combination of a file identifier that identifies a file managed in the file management system and a version identifier that identifies a version of the file, the control server including: a permission information request unit configured to, in a case of receiving a usage request that includes a file identifier and a version identifier from a user terminal, transmit a permission information request that is based on the usage request to the distributed ledger system, and acquire, from the distributed ledger, permission information that corresponds to a combination of the file identifier and the version identifier; a file request unit configured to transmit a file request that is based on the usage request to the file management system, and acquire, from the file management system, the file that corresponds to the combination of the file identifier and the version identifier; and a permission information verification unit configured to transmit the file acquired by the file request unit to the user terminal if a user of the user terminal has viewing permission based on the permission information acquired by the permission information request unit.

A second aspect of the present disclosure is a data sharing system including: a distributed ledger system having a distributed ledger; a file management system; and a control server, wherein if the control server receives, from a user terminal, a usage request that includes a file identifier identifying a file managed in the file management system and a version identifier identifying a version of the file, the control server transmits a permission information request that is based on the usage request to the distributed ledger system, and transmits a file request that is based on the usage request to the file management system, upon receiving the file request, the file management system acquires the file that corresponds to a combination of the file identifier and the version identifier, and transmits the file to the control server, the distributed ledger includes permission information indicating whether or not each of one or more users has viewing permission for each combination of a file identifier and a version identifier, upon receiving the permission information request, the distributed ledger system acquires the permission information that corresponds to the combination of the file identifier and the version identifier from the distributed ledger, and transmits the acquired permission information to the control server, and the control server transmits the file to the user terminal if a user of the user terminal has viewing permission based on the permission information.

A third aspect of the present disclosure is a control program for execution by a computer that is a control server in a data sharing system that includes the control server, a file management system, and a distributed ledger system having a distributed ledger that includes permission information indicating whether or not each of one or more users has viewing permission for each combination of a file identifier that identifies a file managed in the file management system and a version identifier that identifies a version of the file, the control program causing the computer to execute: receiving a usage request that includes a file identifier and a version identifier from a user terminal, transmitting a permission information request that is based on the usage request to the distributed ledger system, and acquiring, from the distributed ledger, permission information that corresponds to a combination of the file identifier and the version identifier; transmitting a file request that is based on the usage request to the file management system, and acquiring, from the file management system, the file that corresponds to the combination of the file identifier and the version identifier; and transmitting the file to the user terminal if a user of the user terminal has viewing permission based on the permission information.

Effects of the Invention

According to the technology disclosed herein, the viewing permission of a file managed by a file management system can be managed separately for versions before and after an update.

DESCRIPTION OF EMBODIMENTS

Figure 1:
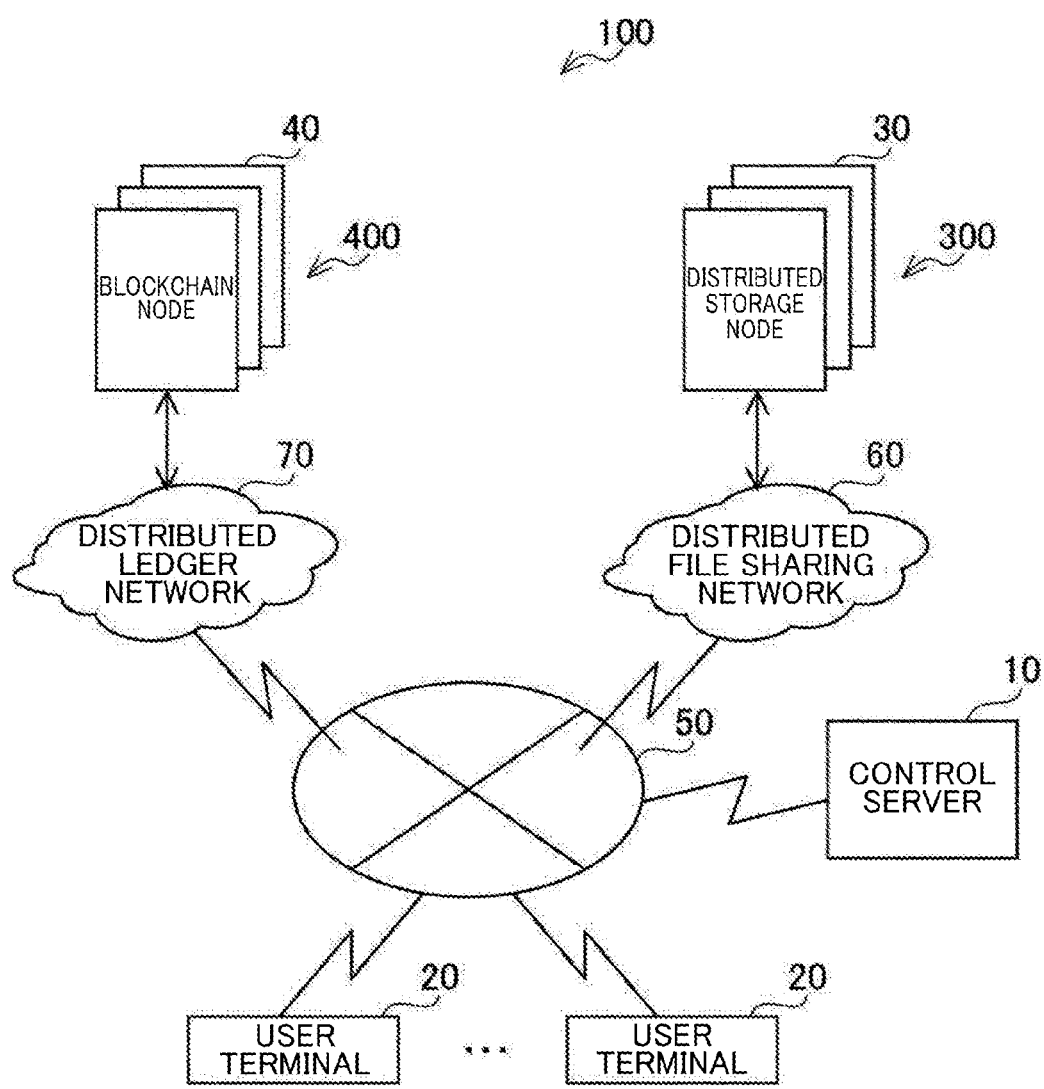
FIG. 1 is a block diagram showing a configuration of a data sharing system according to an embodiment.

Hereinafter, an example of an embodiment of the technology disclosed herein will be described with reference to the drawings. Note that components and parts that are the same or equivalent in the drawings are denoted by the same reference numerals. Also, the dimensional ratios in the drawings are exaggerated for convenience in the description and may differ from the actual ratios.

Overview of Embodiment

In the present embodiment, an identifier that uniquely identifies a file is prepared, and an identifier for version control is also prepared. Specifically, when a file is registered, an identifier that uniquely identifies the file (called a document ID) and an identifier for identifying the version of the file (called a document version ID) are prepared. When the file is updated, the document ID is inherited by the new file after the update, but a new document version ID is generated. This makes it possible to distinguish between updated and non-updated versions of the same file. A distributed ledger stores transactions that each include a document ID and a document version ID. A transaction also includes permission information indicating whether or not users can view the file that corresponds to the combination of the document ID and the document version ID in the transaction.

When a user B requests a version oldA of a file FileA from a distributed storage node via a control server, the document version ID indicating the version oldA is included in the file request.

Using the document ID and the document version ID that indicate the version oldA of the file FileA, the control server acquires the version oldA of the file FileA from the distributed storage node. The control server also uses the document ID of the file FileA and the document version ID of the version oldA to check user B permission information that is written in a transaction stored in the distributed ledger. At this time, the control server checks whether the user B has permission to view the version oldA of the file FileA.

Accordingly, even if the file FileA has been updated, the user B can view the non-updated version of the file FileA according to the past permission.

Configuration of Data Sharing System of Present Embodiment

The following describes the data sharing system of the present embodiment.

FIG. 1 is a block diagram showing an example of the functional configuration of a data sharing system 100 according to the present embodiment.

As shown in FIG. 1, the data sharing system 100 according to the present embodiment includes a control server 10, a plurality of user terminals 20, a file management system 300, and a distributed ledger system 400. The control server 10, the plurality of user terminals 20, the file management system 300, and the distributed ledger system 400 are connected via a network 50.

Configuration of Control Server of Present Embodiment

Figure 2:
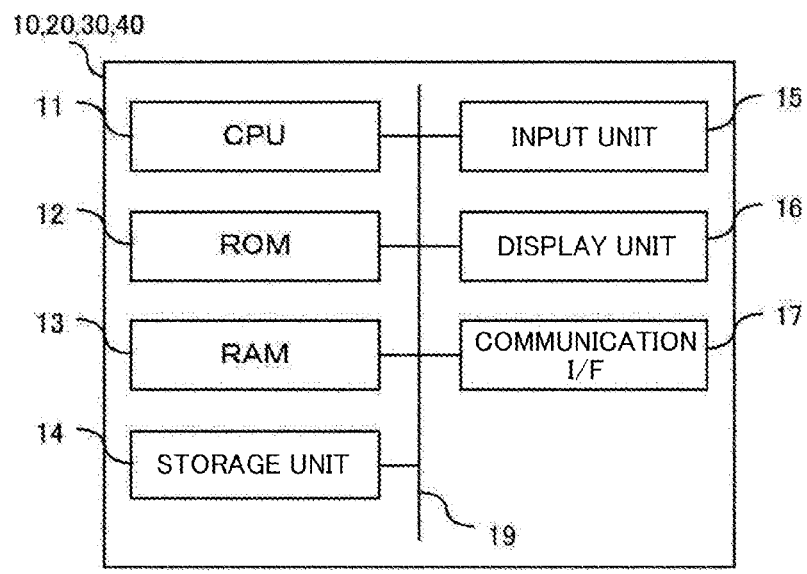
FIG. 2 is a schematic block diagram of an example of a computer that functions as a control server, a user terminal, a distributed storage node, and a blockchain node according to the embodiment.

FIG. 2 is a block diagram showing the hardware configuration of the control server 10 of the present embodiment.

As shown in FIG. 2, the control server 10 includes a CPU (Central Processing Unit) 11, a ROM (Read Only Memory) 12, a RAM (Random Access Memory) 13, a storage unit 14, an input unit 15, a display unit 16, and a communication interface (I/F) 17. These members are connected to each other via a bus 19 so as to be able to communicate with each other.

The CPU 11 is a central processing unit that executes various programs and controls various units. Specifically, the CPU 11 reads a program from the ROM 12 or the storage unit 14, and executes the program using the RAM 13 as a work area. The CPU 11 controls the above members and performs various types of arithmetic processing in accordance with the program stored in the ROM 12 or the storage unit 14. In the present embodiment, a control program is stored in the ROM 12 or the storage unit 14. The control program may be one program or a program group made up of a plurality of programs or modules.

The ROM 12 stores various programs and various data. The RAM 13 temporarily stores a program or data as a work area. The storage unit 14 is constituted by an HDD (Hard Disk Drive), an SSD (Solid State Drive), or the like, and stores various programs, including an operating system, and various data.

The input unit 15 includes a pointing device such as a mouse, and a keyboard, and is used for giving various input.

The display unit 16 is a liquid crystal display for example, and displays various types of information. The display unit 16 may adopt a touch panel method and function as the input unit 15.

The communication interface 17 is an interface for communicating with other devices, and uses a standard such as Ethernet (registered trademark), FDDI, or Wi-Fi (registered trademark).

Figure 3:
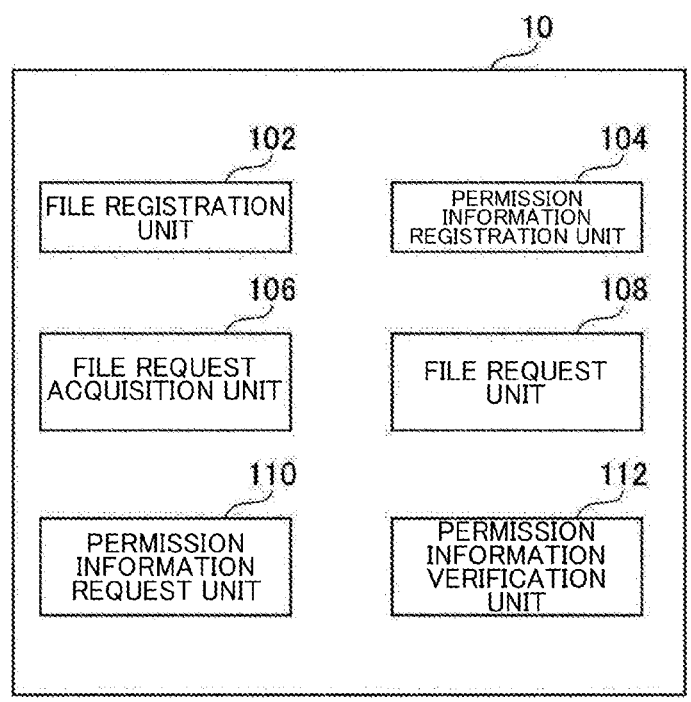
FIG. 3 is a block diagram showing a configuration of the control server according to the embodiment.

Next, the functional configuration of the control server 10 will be described. FIG. 3 is a block diagram showing an example of the functional configuration of the control server 10.

Functionally, as shown in FIG. 3, the control server 10 has a file registration unit 102, a permission information registration unit 104, a file request acquisition unit 106, a file request unit 108, a permission information request unit 110, and a permission information verification unit 112.

Upon receiving a new file from the user terminal 20 for example, the file registration unit 102 transmits the new file to the file management system 300 and registers the file in the file management system 300. At this time, the file registration unit 102 generates a combination of a new document ID and document version ID, and registers the file in the file management system 300 in association with the combination of the new document ID and document version ID.

Also, in the case of a file already managed in the file management system 300, upon receiving an updated file from the user terminal 20, the file registration unit 102 transmits the updated file to the file management system 300 and registers the updated file in the file management system 300. At this time, the file registration unit 102 generates a new document version ID, the and registers the updated file in the file management system 300 in association with a combination of the same document ID as the non-updated file and the new document version ID.

In the case where a new file is registered in the file management system 300 by the file registration unit 102, the permission information registration unit 104 receives permission information regarding the new file from the user terminal 20. The permission information registration unit 104 transmits, to the distributed ledger system 400, the permission information that was received for the combination of the new document ID and document version ID that were generated for the new file by the file registration unit 102. Accordingly, the permission information regarding the combination of the document ID and the document version ID is registered in the distributed ledger.

In the case where a file already managed in the file management system 300 is updated by the file registration unit 102, the permission information registration unit 104 receives permission information regarding the updated file from the user terminal 20. The permission information registration unit 104 transmits, to the distributed ledger system 400, the permission information that was received for the combination of the document ID and the document version ID that were generated for the updated file by the file registration unit 102. Accordingly, the permission information regarding the combination of the document ID and the document version ID is registered in the distributed ledger.

Figure 4:
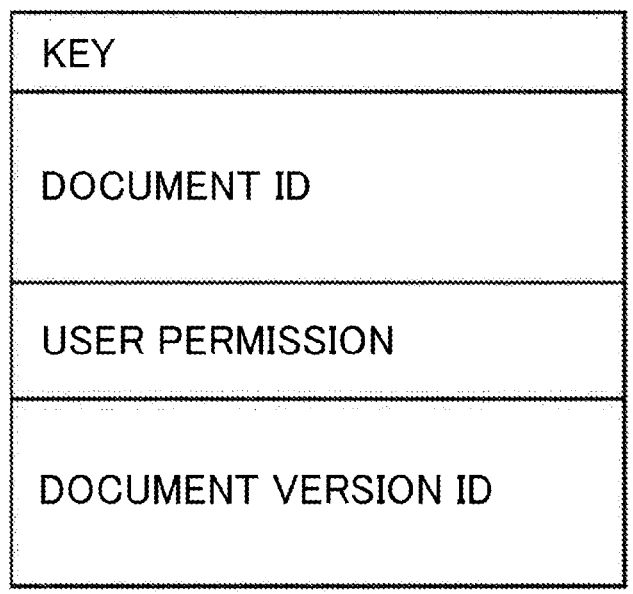
FIG. 4 is a diagram showing an example of a transaction.

Here, when registering permission information in the distributed ledger, the permission information registration unit 104 generates a transaction having a data structure as shown in FIG. 4 and transmits the transaction to the distributed ledger system 400. Specifically, the transaction data structure includes the following items: a key, a document ID, a user permission, and a document version ID. The key is a value for identifying a transaction. The document ID is a hash value of an identifier (e.g., "FileA") that uniquely identifies a document. Note that the document ID may be a plain text identifier that uniquely identifies a document.

The user permission is a hash structure that indicates whether or not each of one or more users can view the corresponding file, and the owner of the file, as shown below.
{User A: view, User B: view, User C: view/owner}

Note that the user permission may be plain text that indicates whether or not the user can view the file and the owner of the file.

The document version ID is a hash value of an identifier that uniquely identifies the version of a document (e.g., "oldA" or "newA"). Note that the document version ID may be a plain text identifier that uniquely identifies the version of the document.

Note that information other than the above may be added to the transaction.

The file request acquisition unit 106 acquires a usage request that includes a document ID for identifying a file managed in the file management system 300 and a document version ID for identifying a file version, which were received from the user terminal 20.

The file request unit 108 transmits a file request that is based on the usage request acquired by the file request acquisition unit 106 to the file management system 300, and acquires the file that corresponds to the combination of the document ID and the document version ID included in the file request from the file management system 300.

The permission information request unit 110 transmits a permission information request that is based on the usage request acquired by the file request acquisition unit 106 to the distributed ledger system 400, and acquires permission information that corresponds to the combination of the document ID and the document version ID included in the permission information request from the distributed ledger system 400.

If the user of the user terminal 20 that transmitted the usage request can view the file based on the permission information acquired by the permission information request unit 110, the permission information verification unit 112 transmits the file acquired by the file request unit 108 to user terminal 20. On the other hand, if the user of the user terminal 20 that transmitted the usage request cannot view the file based on the permission information acquired by the permission information request unit 110, the permission information verification unit 112 discards the file acquired by the file request unit 108 instead of transmitting the file to the user terminal 20.

Configuration of User Terminal of Present Embodiment

FIG. 2 is a block diagram showing the hardware configuration of the user terminal 20 of the present embodiment.

As shown in FIG. 2, similarly to the control server 10, the user terminal 20 includes a CPU 11, a ROM 12, a RAM 13, a storage unit 14, an input unit 15, a display unit 16, and a communication interface (I/F) 17.

The input unit 15 accepts an input of a new file or an updated version of a file that is already managed in the file management system 300.

Also, the input unit 15 accepts an input of permission information that indicates whether or not each of one or more users can view the file that was input.

The input unit 15 accepts an input of a combination of a document ID and a document version ID of a file that a user wishes to view.

The user terminal 20 transmits, to the control server 10, a new file or an updated file that was input.

The user terminal 20 transmits, to the control server 10, a usage request that includes a document ID and a document version ID that were input.

The user terminal 20 displays a file transmitted from the control server 10 on the display unit 16.

Configuration of File Management System of Present Embodiment

As shown in FIG. 1, the file management system 300 includes a plurality of distributed storage nodes 30 and a distributed file sharing network 60.

As shown in FIG. 2, the hardware configuration of the distributed storage node 30 of the present embodiment is similar to that of the control server 10.

Files transmitted from the control server 10 are distributed via the distributed file sharing network 60 and stored in the distributed storage nodes 30 in association with a combination of a document ID and a document version ID.

When a distributed storage node 30 receives a file request from the control server 10 via the distributed file sharing network 60, if a file that corresponds to the combination of the document ID and the document version ID included in the file request is stored in that distributed storage node 30, the distributed storage node 30 transmits that file to the control server 10. On the other hand, if the file that corresponds to the combination of the document ID and the document version ID included in the file request is not stored in that distributed storage node 30, the distributed storage node 30 transmits the file request to another distributed storage node 30.

Configuration of Distributed Ledger System of Present Embodiment

As shown in FIG. 1, the distributed ledger system 400 includes a plurality of blockchain nodes 40 and a distributed ledger network 70.

As shown in FIG. 2, the hardware configuration of the blockchain node 40 of the present embodiment is similar to that of the control server 10.

The blockchain nodes 40 generate blocks that are groups of transactions transmitted from the control server 10 via the distributed ledger network 70 and connect the blocks to a blockchain for storage in ledger data.

Upon receiving a permission information request from the control server 10 via the distributed ledger network 70, a distributed storage node 30 searches the ledger data for permission information that corresponds to the combination of the document ID and the document version ID included in the permission information request, and transmits the found permission information to the control server 10.

Operation of Data Sharing System of Present Embodiment

Next, the operation of the data sharing system 100 according to the present embodiment will be described.

Figure 5:
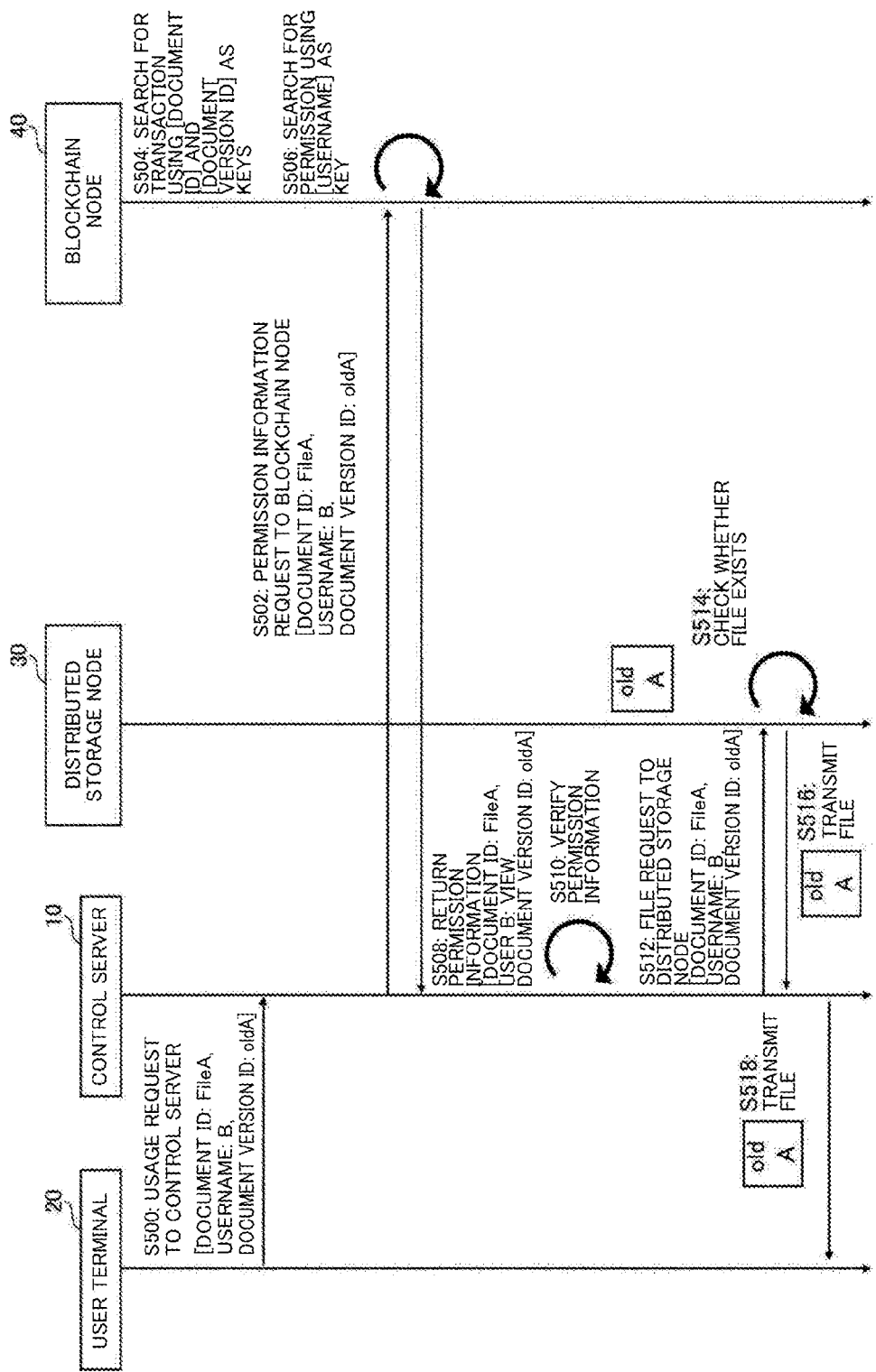
FIG. 5 is a sequence diagram showing a flow of processing in the data sharing system according to the embodiment.

FIG. 5 is a sequence diagram showing an example of the flow of overall processing, including processing of the control program according to the present embodiment. FIG. 5 shows the case where the user B can view the version oldA of the file FileA, and the version oldA of the file FileA is stored in one distributed storage node 30. Here, the case where the user B acquires the version oldA of the file FileA via the control server 10 will be described as an example.

First, in step S500, the user terminal 20 of the user B transmits the following usage request, which includes a document ID, a username, and a document version ID, to the control server 10.
Usage Request [Document ID: FileA, Username: B, Document Version ID: oldA]

In step S502, the control server 10 transmits the following permission information request to a blockchain node 40 based on the usage request that was transmitted from the user terminal 20.
Permission Information Request [Document ID: FileA, Username: B, Document Version ID: oldA]

In step S504, the blockchain node 40 searches the ledger data for a transaction that includes corresponding permission information using the document ID and the document version ID as keys.

In step S506, the blockchain node 40 searches the permission information included in the transaction that was found in step S502 above for permission information that indicates whether or not the user of the user terminal 20 can view the transaction, using the username as a key.

In step S508, the blockchain node 40 transmits the permission information that was found in step S506 to the control server 10. Here, the items in the permission information that is to be transmitted are a document ID, user viewing permission, and a document version ID, as shown below.
Permission Information [Document ID: FileA, User B: View, Document Version ID: oldA]

In step S510, the control server 10 verifies whether or not the user of the user terminal 20 that transmitted the usage request can view the file that corresponds to the combination of the document ID and the document version ID included in the file request. In the example of FIG. 5, it is determined that the user B can view the version oldA of the file FileA.

In step S512, the control server 10 transmits the following file request, which is based on the usage request that was transmitted from the user terminal 20, to one distributed storage node 30.
File Request [Document ID: FileA, Username: B, Document Version ID: oldA]

In step S514, the distributed storage node 30 checks whether or not the version oldA of the file FileA is stored therein based on the document ID and the document version ID included in the file request that was received from the control server 10. In the example of FIG. 5, it is confirmed that the version oldA of the file FileA is stored in the distributed storage node 30 that received the file request.

In step S516, the distributed storage node 30 transmits the stored version oldA of the file FileA to the control server 10.

Note that if the version oldA of the file FileA is not stored in the distributed storage node 30 that received the file request, the distributed storage node 30 transmits the file request to another distributed storage node 30.

In step S518, the control server 10 transmits the version oldA of the file FileA that was acquired in step S516 to the user terminal 20. Accordingly, the version oldA of the file FileA is displayed on the display unit 16 of the user terminal 20, and the user B views the file.

Note that a configuration is possible in which if the result of the processing of steps S502 to S510 is that the user of the user terminal 20 cannot view the file, steps S512 to S516 are not executed. Also, although the case where steps S512 to S516 are executed after the processing of steps S502 to S510 has been described as an example, the present invention is not limited to this. For example, steps S502 to S510 may be executed after the processing of steps S512 to S516. Also, the processing of steps S502 to S510 and steps S512 to S516 may be executed in parallel.

Figure 6:
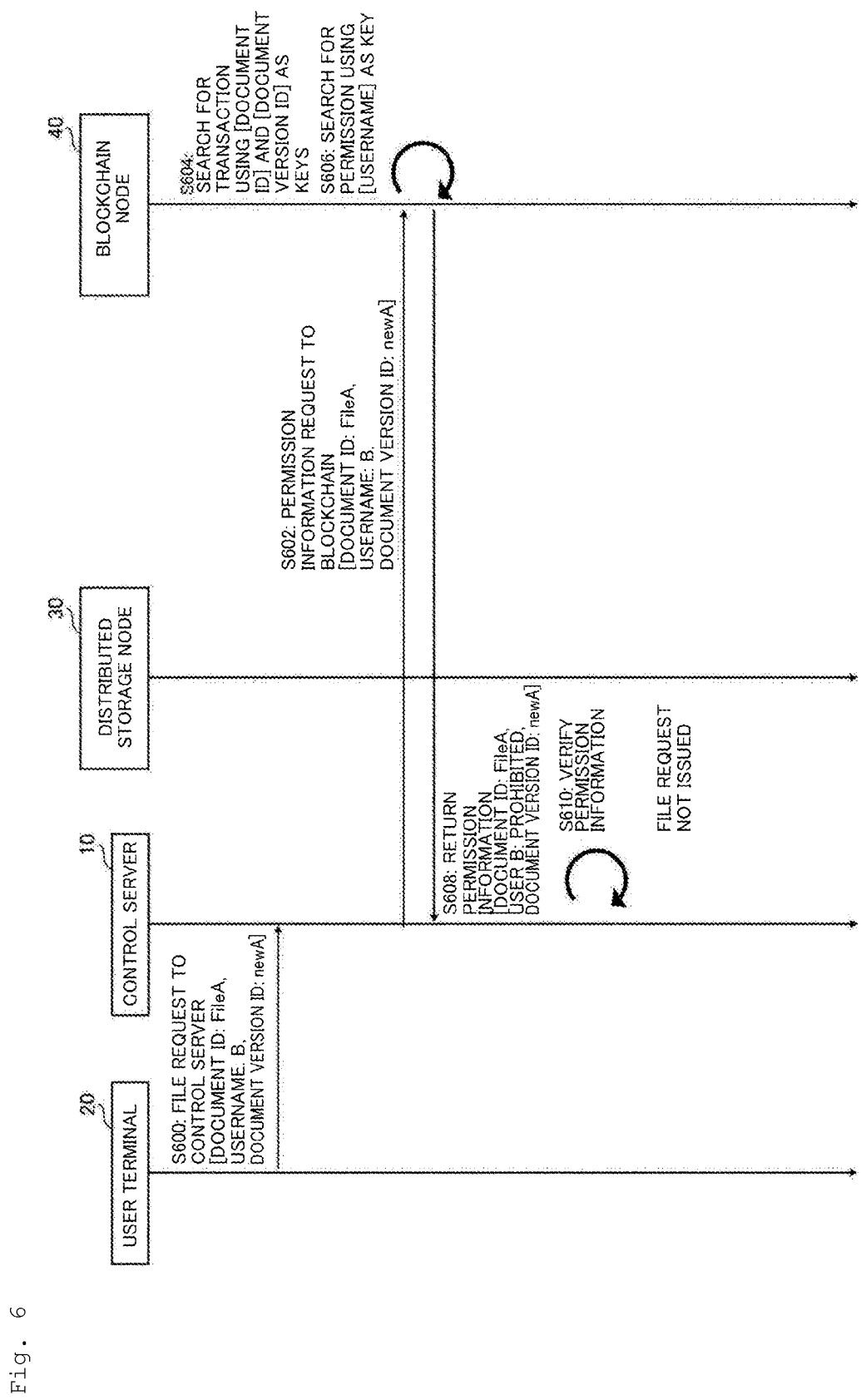
FIG. 6 is a sequence diagram showing a flow of processing in the data sharing system according to the embodiment.

Next, another example of the flow of overall processing, including processing of the control program according to the present embodiment, will be described with reference to FIG. 6. FIG. 6 shows the case where the user B cannot view the version newA of the file FileA, and the version newA of the file FileA is stored in one distributed storage node 30. Here, the case where the user B requests the version newA of the file FileA via the control server 10 will be described as an example. Specifically, the following describes an example of the case where the user B has viewing permission for the file FileA at first, but then the file FileA is updated and the user B loses viewing permission for the updated file FileA. Here, the non-updated version is oldA, and the updated version is newA.

First, in step S600, the user terminal 20 of the user B transmits the following usage request, which includes a document ID, a username, and a document version ID, to the control server 10.

Usage Request [Document ID: FileA, Username: B, Document Version ID: newA]

In step S602, the control server 10 transmits the following permission information request, which is based on the usage request transmitted from the user terminal 20, to a blockchain node 40.

Permission Information Request [Document ID: FileA, Username: B, Document Version ID: newA]

In step S604, the blockchain node 40 searches the ledger data for a transaction that includes corresponding permission information using the document ID and the document version ID as keys.

In step S606, the blockchain node 40 searches the permission information included in the transaction that was found in step S604 above for permission information that indicates whether or not the user of the user terminal 20 can view the transaction, using the username as a key.

In step S608, the blockchain node 40 transmits the permission information searched in step S606 to the control server 10. Here, the items in the permission information that is to be transmitted are a document ID, user viewing prohibited, and a document version ID, as shown below.

Permission Information [Document ID: FileA, User B: Prohibited, Document Version ID: newA]

In step S610, the control server 10 verifies whether or not the user of the user terminal 20 that transmitted the usage request can view the file that corresponds to the combination of the document ID and the document version ID included in the file request. In the example of FIG. 6, it is determined that the user B cannot view the version newA of the file FileA.

At this time, the control server 10 does not issue a file request for the version newA of the file FileA.

As described above, according to the data sharing system according to the present embodiment, the viewing permission of files distributed and managed by a file management system can be managed separately for versions before and after an update. Also, because permission information is saved in a distributed ledger system, falsification of the permission information can be prevented.

Note that the present invention is not limited to the embodiment described above, and various modifications and applications are possible without departing from the gist of the present invention.

For example, the various types of processing executed due to the CPU reading and executing software (a program) in the above embodiment may be executed by various types of processors other than a CPU. Other examples of processors in this case include a PLD (Programmable Logic Device) such as an FPGA (Field-Programmable Gate Array), whose circuit configuration can be changed after manufacturing, and a dedicated electric circuit such as an ASIC (Application Specific Integrated Circuit), which is a processor having a circuit configuration designed exclusively for executing specific processing. Also, such processing may be executed by one of the aforementioned processors, or may be executed by a combination of two or more processors of the same type or different types (e.g., by a plurality of FPGAs, or by a combination of a CPU and an FPGA). Also, the hardware structure of such processors is, more specifically, an electric circuit that includes a combination of circuit elements such as semiconductor elements.

Moreover, although a mode in which the control program is stored (installed) in the storage unit 14 in advance has been described in the above embodiments, the present invention is not limited to this. The program may be provided in a mode of being stored on a non-transitory storage medium such as a CD-ROM (Compact Disk Read Only Memory), a DVD-ROM (Digital Versatile Disk Read Only Memory), or a USB (Universal Serial Bus) memory. Also, the program may be downloaded from an external device via a network.

Furthermore, the control server may have the functionality of a distributed storage node or a blockchain node.

Also, although the case where the permission information indicates whether or not a user has viewing permission has been described as an example, the permission information may indicate not only whether or not the user has viewing permission, but also whether or not the user has writing permission.

The following additional notes are further disclosed in connection with the above embodiments.

Additional Note 1

A control server in a data sharing system that includes the control server, a file management system, and a distributed ledger system having a distributed ledger that includes permission information indicating whether or not each of one or more users has viewing permission for each combination of a file identifier that identifies a file managed in the file management system and a version identifier that identifies a version of the file, the control server comprising:
  a memory; and
  at least one processor that is connected to the memory, wherein the processor
    receives a usage request that includes a file identifier and a version identifier from a user terminal, transmitting a permission information request that is based on the usage request to the distributed ledger system, and acquires, from the distributed ledger, permission information that corresponds to a combination of the file identifier and the version identifier;
    transmits a file request that is based on the usage request to the file management system, and acquires, from the file management system, the file that corresponds to the combination of the file identifier and the version identifier; and
    transmits the file to the user terminal if a user of the user terminal has viewing permission based on the permission information.

Additional Note 2

A non-transitory storage medium storing a program that can be executed by a computer so as to execute control processing in a data sharing system that includes a control server, a file management system, and a distributed ledger system having a distributed ledger that includes permission information indicating whether or not each of one or more users has viewing permission for each combination of a file identifier that identifies a file managed in the file management system and a version identifier that identifies a version of the file, the control processing
receiving a usage request that includes a file identifier and a version identifier from a user terminal, transmitting a permission information request that is based on the usage request to the distributed ledger system, and acquiring, from the distributed ledger, permission information that corresponds to a combination of the file identifier and the version identifier;

transmitting a file request that is based on the usage request to the file management system, and acquiring, from the file management system, the file that corresponds to the combination of the file identifier and the version identifier; and transmitting the file to the user terminal if a user of the user terminal has viewing permission based on the permission information.

REFERENCE SIGNS LIST

10 Control server
20 User terminal
30 Distributed storage node
40 Blockchain node
50 Network
60 Distributed file sharing network
70 Distributed ledger network
100 Data sharing system
102 File registration unit
104 Permission information registration unit
106 File request acquisition unit
108 File request unit
110 Permission information request unit
112 Permission information verification unit
300 File management system
400 Distributed ledger system

The invention claimed is:

1. A control server in a data sharing system, the control server comprising:
a memory, and
at least one processor coupled to the memory,
the at least one processor being configured to:
register a new file in a file management system and update a file managed in the file management system, as well as register a combination of a file identifier and a version identifier of the new file or the updated file;
if a new file is registered in the file management system or a file managed in the file management system is updated, transmit, to a distributed ledger system, a transaction data structure including the file identifier, the version identifier and permission information of the new file or the updated file;
receive a usage request from a user terminal, wherein the user request comprises a file identifier of a file being requested for retrieval, a version identifier of the file, and a user identifier of a user of the user terminal;
transmit a permission information request that is based on the usage request to the distributed ledger system;
acquire, from the distributed ledger system, permission information that corresponds to a combination of the file identifier and the version identifier, wherein the data sharing system further comprises the distributed ledger system and the file management system,
the distributed ledger system comprises a distributed ledger,
the distributed ledger comprises permission information,
the permission information indicates whether one or more users have viewing permission for accessing the file as specified by a combination of the file identifier and the version identifier, and
the file identifier identifies the file managed in the file management system, and the version identifier identifiers a version of the file;
transmit a file request that is based on the usage request to the file management system, and acquire, from the file management system, a file that corresponds to the combination of the file identifier and the version identifier, wherein the file before update is acquired from the file management system if the version identifier included in the usage request is a version identifier of a file before update; and
transmit the acquired file to the user terminal based on whether the user of has viewing permission according to the acquired permission information.

2. The control server according to claim 1,
wherein, if the user of the user terminal has viewing permission based on the acquired permission information, the at least one processor is configured to transmit a file request that is based on the usage request to the file management system and acquires, from the file management system, the file that corresponds to the combination of the file identifier and the version identifier.

3. A data sharing system comprising:
a distributed ledger system having a distributed ledger;
a file management system; and
a control server comprising a processor configured to execute operations comprising:
registering a new file in a file management system and update a file managed in the file management system, as well as register a combination of a file identifier and a version identifier of the new file or the updated file;
if a new file is registered in the file management system or a file managed in the file management system is updated, transmitting, to a distributed ledger system, a transaction data structure including the file identifier, the version identifier and permission information of the new file or the updated file;
receiving, a usage request from a user terminal, wherein the user request comprises a file identifier of a file being requested for retrieval, a version identifier of the file, and a user identifier of a user of the user terminal;
transmitting a permission information request that is based on the usage request to the distributed ledger system;
acquiring, from the distributed ledger system, permission information that corresponds to the combination of the file identifier and the version identifier,
wherein the data sharing system further comprises the distributed ledger system and the file management system,
the distributed ledger system comprises a distributed ledger,
the distributed ledger comprises permission information, the permission information indicates whether one or more users have viewing permission for accessing the file as specified by a combination of the file identifier and the version identifier, and the file identifier identifies the file managed in the file management system, and the version identifier identifiers a version of the file;

transmitting a file request that is based on the usage request to the file management system, and acquire, from the file management system, a file that corresponds to the combination of the file identifier and the version identifier, wherein the file before update is acquired from the file management system if the version identifier included in the usage request is a version identifier of a file before update; and transmitting the acquired file to the user terminal based on whether the user has viewing permission according to the acquired permission information.

4. The data sharing system according to claim 3, wherein in a case of registering a new file in the file management system or updating a file managed in the file management system, the control server transmits, to the distributed ledger system, permission information regarding a combination of the file identifier and the version identifier of the new file or the updated file.

5. The data sharing system according to claim 4, wherein the file management system manages files that are distributed among a plurality of distributed storage nodes.

6. A non-transitory storage medium storing a computer-executable control program instructions that when executed by a processor causes a computer as a control server to execute operations in a data sharing system, comprising:

register a new file in a file management system and update a file managed in the file management system, as well as register a combination of a file identifier and a version identifier of the new file or the updated file;

if a new file is registered in the file management system or a file managed in the file management system is updated, transmit, to a distributed ledger system, a transaction data structure including the file identifier, the version identifier and permission information of the new file or the updated file;

receiving a usage request from a user terminal, wherein the user request comprises a file identifier of a file being requested for retrieval, a version identifier of the file, and a user identifier of a user of the user terminal;

transmitting a permission information request that is based on the usage request to the distributed ledger system;

acquiring, from the distributed ledger system, permission information that corresponds to a combination of the file identifier and the version identifier, wherein the data sharing system further comprises the distributed ledger system and the file management system, the distributed ledger system comprises a distributed ledger, the distributed ledger comprises permission information, the permission information indicates whether one or more users have viewing permission for accessing the file as specified by a combination of the file identifier and the version identifier, and the file identifier identifies the file managed in the file management system, and the version identifier identifiers a version of the file;

transmitting a file request that is based on the usage request to the file management system, and acquiring, from the file management system, a file that corresponds to the combination of the file identifier and the version identifier, wherein the file before update is acquired from the file management system if the version identifier included in the usage request is a version identifier of a file before update; and transmitting the acquired file to the user terminal based on whether the user has viewing permission according to the acquired permission information.

\* \* \* \* \*